United States Patent
Satat

(10) Patent No.: US 11,745,353 B2
(45) Date of Patent: Sep. 5, 2023

(54) RECOVERING MATERIAL PROPERTIES WITH ACTIVE ILLUMINATION AND CAMERA ON A ROBOT MANIPULATOR

(71) Applicant: X Development LLC, Mountain View, CA (US)

(72) Inventor: Guy Satat, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 453 days.

(21) Appl. No.: 17/106,889

(22) Filed: Nov. 30, 2020

(65) Prior Publication Data

US 2022/0168898 A1 Jun. 2, 2022

(51) Int. Cl.
*G06V 10/60* (2022.01)
*B25J 9/16* (2006.01)
(Continued)

(52) U.S. Cl.
CPC ............ *B25J 9/1697* (2013.01); *B25J 9/163* (2013.01); *B25J 9/1664* (2013.01); *B25J 19/023* (2013.01);
(Continued)

(58) Field of Classification Search
CPC ........ B25J 9/1697; B25J 9/163; B25J 9/1664; B25J 19/023; B25J 5/007; G01N 21/359;
(Continued)

(56) References Cited

U.S. PATENT DOCUMENTS 8,773,508 B2 7/2014 Daniel et al.
8,983,797 B2 3/2015 Ingram, Jr. et al.
(Continued)

FOREIGN PATENT DOCUMENTS

WO 2019132783 7/2019
WO 2020083924 4/2020

OTHER PUBLICATIONS

Dana et al., "Reflectance and Texture of Real-World Surfaces," Columbia University Technical Report CUCS-046-96, Summary, downloaded Jul. 16, 2020, 10 pages.
(Continued)

*Primary Examiner* — Stephen P Coleman
(74) *Attorney, Agent, or Firm* — McDonnell Boehnen Hulbert & Berghoff LLP

(57) ABSTRACT

A method includes identifying a target surface in an environment of a robotic device. The method further includes controlling a moveable component of the robotic device to move along a motion path relative to the target surface, wherein the moveable component comprises a light source and a camera. The method additionally includes receiving a plurality of images from the camera when the moveable component is at a plurality of poses along the motion path and when the light source is illuminating the target surface. The method also includes determining bidirectional reflectance distribution function (BRDF) image data, wherein the BRDF image data comprises the plurality of images converted to angular space with respect to the target surface. The method further includes determining, based on the BRDF image data and by applying at least one pre-trained machine learning model, a material property of the target surface.

20 Claims, 9 Drawing Sheets

(51) Int. Cl.

| | |
|---|---|
| *B25J 19/02* | (2006.01) |
| *G01N 21/359* | (2014.01) |
| *G06F 18/21* | (2023.01) |
| *G06F 18/24* | (2023.01) |
| *H04N 23/10* | (2023.01) |
| *H04N 23/56* | (2023.01) |
| *H04N 23/90* | (2023.01) |
| *H04N 23/695* | (2023.01) |
| *G06V 10/58* | (2022.01) |
| *B25J 5/00* | (2006.01) |
| *G01N 21/55* | (2014.01) |

(52) U.S. Cl.
CPC .......... *G01N 21/359* (2013.01); *G06F 18/21* (2023.01); *G06F 18/24* (2023.01); *G06V 10/60* (2022.01); *H04N 23/10* (2023.01); *H04N 23/56* (2023.01); *H04N 23/695* (2023.01); *H04N 23/90* (2023.01); *B25J 5/007* (2013.01); *G01N 2021/555* (2013.01); *G06V 10/58* (2022.01)

(58) Field of Classification Search
CPC ............. G01N 2021/555; G01N 21/31; G01N 2021/1776; G01N 2201/0216; G01N 21/55; G01N 2201/1296; G06F 18/21; G06F 18/24; G06V 10/60; G06V 10/58; H04N 23/10; H04N 23/56; H04N 23/695; H04N 23/90; G01B 11/2545; G01B 11/303; G06N 3/08; G06N 20/00
USPC ........................................................ 382/153
See application file for complete search history.

(56) References Cited

U.S. PATENT DOCUMENTS

| | | | |
|---|---|---|---|
| 9,082,071 B2 | 7/2015 | Skaff | |
| 9,489,775 B1 | 11/2016 | Bell et al. | |
| 9,562,857 B2 | 2/2017 | Debevec et al. | |
| 10,198,666 B2 | 2/2019 | Aoba | |
| 10,650,588 B2 | 5/2020 | Hazeghi et al. | |
| 2003/0071194 A1 | 4/2003 | Mueller et al. | |
| 2013/0093883 A1 | 4/2013 | Wang et al. | |
| 2016/0156899 A1 | 6/2016 | Yomoaki et al. | |
| 2018/0047208 A1 | 2/2018 | Marin et al. | |
| 2019/0108396 A1 | 4/2019 | Dal Mutto et al. | |
| 2021/0035354 A1* | 2/2021 | Williams | G01B 11/303 |

OTHER PUBLICATIONS

Dana et al., "Reflectance and Texture of Real-World Surfaces," Columbia University Technical Report CUCS-046-96, Technical Report, Dec. 1996, 60 pages.
Li, Yin, "CS 4495 Computer Vision, Photometry, A. Bobick," School of Interactive Computing, downloaded Jul. 16, 2020, 57 pages.
Narasimhan, Srinivasa, "Measure, measure, measure: BRDF, BTF, Light Fields, Lecture #6," Appearance Modeling, 2005, 38 pages.
Saikia, Sakib, "Deriving Lambertian BRDF from first principles, Sep. 10, 2019," https://sakibsaikia.github.io/graphics/2019/09/10/Deriving-Lambertian-BRDF-From-First-Principles.html, downloaded Dec. 1, 2020, 7 pages.
Shell II, James R., "Bidirectional Reflectance: An Overview with Remote Sensing Applications & Measurement Recommendations," Center for Imaging Science, May 26, 2004, 80 pages.
Marschner et al., "Measuring and modeling the appearance of finished wood," XP058335261, 2005, pp. 727-734.
Xue et al., "Differential Viewpoints for Ground Terrain Material Recognition," Arxiv.org, Cornell University Library, 2020.
Keung et al. "Surface-Type Classification Using RGB-D" IEEE Transactions on Automation Science and Engineering, vol. 11, No. 2, 2014, pp. 359-366.
Weinmann et al., "Advancies in geometry and reflectance acquisition (course notes)," XP058075388, 2015, pp. 1-71.

* cited by examiner

RECOVERING MATERIAL PROPERTIES WITH ACTIVE ILLUMINATION AND CAMERA ON A ROBOT MANIPULATOR

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

Example embodiments involve a material property determination method for a robotic device. A robotic device may be equipped with a light source and a camera on a moveable component. The moveable component may be controlled along a motion path to take images, which may be used to determine a material property of the surface.

In an embodiment, a method includes identifying a target surface in an environment of a robotic device. The method further includes controlling a moveable component of the robotic device to move along a motion path relative to the target surface, wherein the moveable component comprises a light source and a camera. The method additionally includes receiving a plurality of images from the camera when the moveable component is at a plurality of poses along the motion path and when the light source is illuminating the target surface. The method also includes determining bidirectional reflectance distribution function (BRDF) image data, wherein the BRDF image data comprises the plurality of images converted to angular space with respect to the target surface. The method further includes determining, based on the BRDF image data and by applying at least one pre-trained machine learning model, a material property of the target surface.

In another embodiment, a robotic device includes a control system and a moveable component with a light source and a camera. The control system may be configured to identify a target surface in an environment of a robotic device. The control system may be further configured to control a moveable component of the robotic device to move along a motion path relative to the target surface, wherein the moveable component comprises a light source and a camera. The control system may also be configured to receive a plurality of images from the camera when the moveable component is at a plurality of poses along the motion path and when the light source is illuminating the target surface. The control system may be additionally configured to determine bidirectional reflectance distribution function (BRDF) image data, wherein the BRDF image data comprises the plurality of images converted to angular space with respect to the target surface. The control system may be further configured to determine, based on the BRDF image data and by applying at least one pre-trained machine learning model, a material property of the target surface.

In a further embodiment, a non-transitory computer readable medium is provided which includes programming instructions executable by at least one processor to cause the at least one processor to perform functions. The functions include identifying a target surface in an environment of a robotic device. The functions further include controlling a moveable component of the robotic device to move along a motion path relative to the target surface, wherein the moveable component comprises a light source and a camera. The functions additionally include receiving a plurality of images from the camera when the moveable component is at a plurality of poses along the motion path and when the light source is illuminating the target surface. The functions also include determining bidirectional reflectance distribution function (BRDF) image data, wherein the BRDF image data comprises the plurality of images converted to angular space with respect to the target surface. The functions further include determining, based on the BRDF image data and by applying at least one pre-trained machine learning model, a material property of the target surface.

In another embodiment, a system is provided that includes means for identifying a target surface in an environment of a robotic device. The system further includes means for controlling a moveable component of the robotic device to move along a motion path relative to the target surface, wherein the moveable component comprises a light source and a camera. The system additionally includes means for receiving a plurality of images from the camera when the moveable component is at a plurality of poses along the motion path and when the light source is illuminating the target surface. The system also includes means for determining bidirectional reflectance distribution function (BRDF) image data, wherein the BRDF image data comprises the plurality of images converted to angular space with respect to the target surface. The system further includes means for determining, based on the BRDF image data and by applying at least one pre-trained machine learning model, a material property of the target surface.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
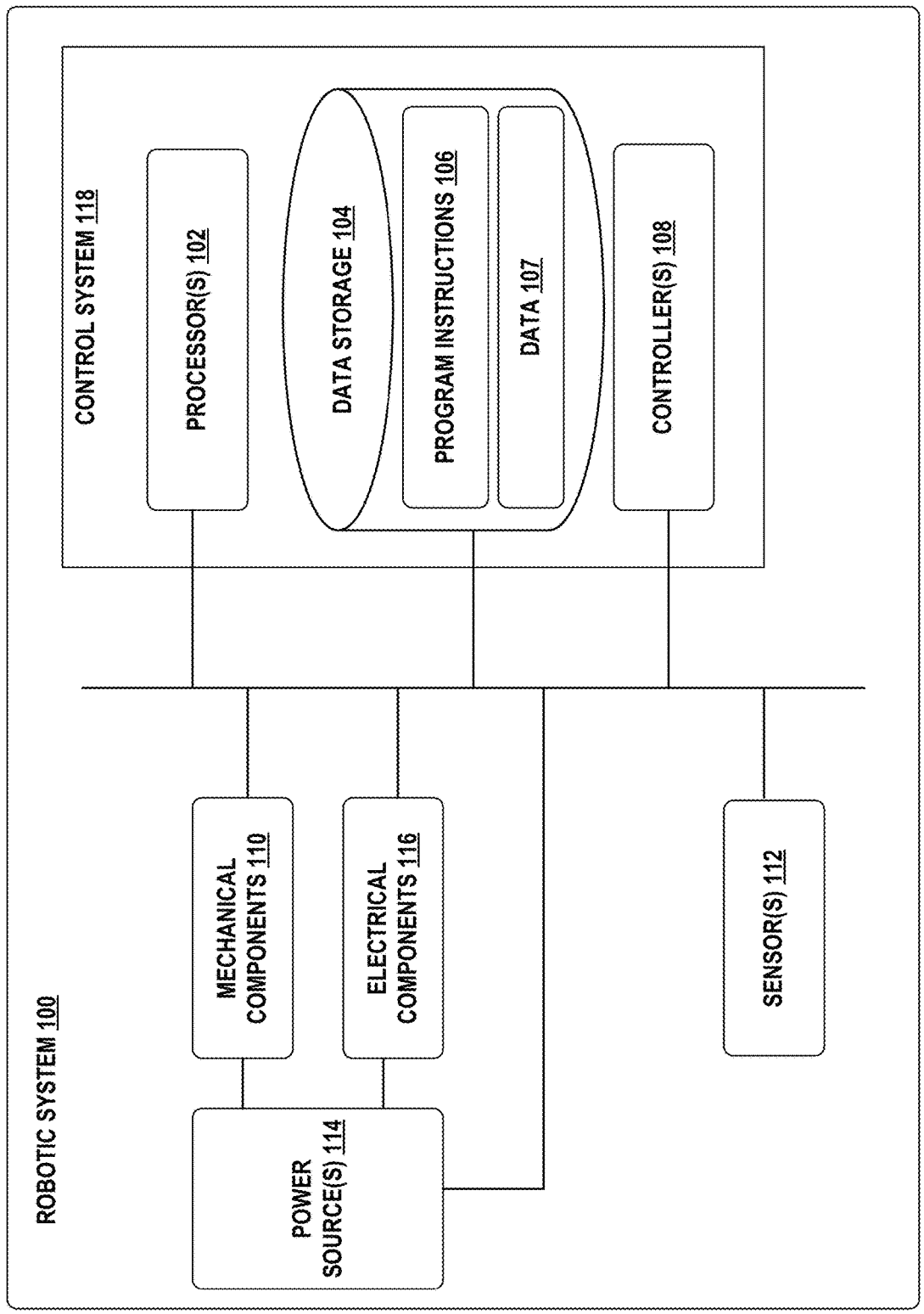
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

Robotic devices may be used for a variety of applications from automating industrial tasks to assisting in household activities. Many of these applications may require robotic devices to have sensor systems to detect objects. Additionally, robotic devices may have moveable components to interact with the surroundings. Moveable components may be manipulated in various ways in accordance with the situation. For example, a user may have a robotic device pick up a container. The sensor system on the robotic device may be used to observe the general surroundings and provide information on specific objects. Provided with the information, a moveable component of the robotic device may be manipulated to grasp the container. Many robotic devices may be able to perform observations through vision based systems composed of sensors such as cameras or LIDAR.

However, differentiating between objects with similar appearances may pose significant difficulty for such vision based systems. For example, a user may request a robotic device to pick up a blank piece of paper. A vision based sensor system with only LIDAR or cameras may have difficulty discriminating between the correct target, e.g. the blank piece of paper and a white tabletop. In another application, a robotic device may be used to sort recyclables. The previously mentioned vision system may have difficulty differentiating between containers made of recyclable plastic and non-recyclable plastic.

Provided herein are techniques for identifying a material property of a target surface by controlling a moveable component of a robotic device. A moveable component of a robotic device may have an end of arm perception system containing a light source and a sensor, such as a camera. The moveable component of the robotic device may be manipulated autonomously so that the camera on the end of arm perception system may capture images of a target surface of an object at various angles. The images may show the target surface illuminated by the light source.

In some examples, the moveable component of the robotic device may be controlled to move along a motion path to obtain a plurality of images of a target surface. The motion path may be determined based on obstacles in the surroundings and/or the geometry of the target surface. For instance, the motion path used to determine a material property of a tabletop may differ from the motion path used to determine a material property of a recyclable container. In some examples, each of the images may be taken approximately the same distance from the object.

The captured images may be used to determine bidirectional reflectance distribution function (BRDF) image data. Generally, the BRDF of a target surface describes surface properties and/or materials of the surface and may differ based on the surface texture and internal structure of a surface. A Lambertian surface may be an ideal diffuse surface, which reflects the same amount of light when viewed from different angles, independent of the direction of the incoming illumination. Accordingly, the BRDF of a Lambertian surface may be a constant. In contrast, a perfectly specular surface may reflect light at the same angle opposite of and relative to the surface normal (e.g. a mirror). Typically, a surface in the environment of a robotic device may not be an ideal diffuse surface nor a perfectly specular surface, but may exhibit a combination of diffuse and specular reflectances. These surface complexities may be more pronounced under various lighting and image angles and may be reflected in the BRDF representation. For example, a white marble tabletop and a piece of white paper may look similar under ambient lighting but may look substantially different under various lighting and image angles. Likewise, a glass jar may look substantially similar to a plastic jar under ambient. lighting, but the glossy surface of a glass jar and the dull matte surface of a plastic jar may be more apparent under various lighting and image angles.

Typically, the BRDF may be a multi-dimensional function representing the reflectance of a surface as a function of incident illumination, measured reflectance, and wavelength. Incident illumination may represent the angles in which a light source may be illuminating the target surface. The incident illumination may be described by two angles in spherical coordinates, the azimuth angle and the elevation angle. The measured reflectance may represent the angles in which light is reflected from the target surface and may also be described by two angles in spherical coordinates, the azimuth a: and the elevation angle. Both the incident illumination and measured reflectance may be measured relative to the surface normal. In order to obtain a complete BRDF, the light source, camera, and wavelength may need to be individually controlled. A complete BRDF may thus be difficult to obtain due to the high dimensionality of the function.

However, in many cases, materials may be classified through measuring a subset of the BRDF. In some examples, BRDF image data may be computed by transforming images to angular space with respect to the object surface. In further examples, an estimated BRDF may be computed from the transformed images. In this case, the BRDF image data may be represented by the coefficients of a multi-dimensional polynomial. A polynomial refers to an algebraic function, the coefficients of which are numbers multiplied by each variable. The variables may have exponents of varying degrees. Models have been developed to represent an estimation of the BRDF of a target surface using a subset of the BRDF. Some examples of such models include the Torrance-Sparrow model, the Maxwell-Beard model, the Cook Torrance model, and the He model.

In order to compute the BRDF image data, variables such as the angles of illumination, angles of reflected light, and wavelength may be needed. Such variables or estimations of such variables may be obtained from algorithms processing image data received from the camera. Alternatively or additionally, such variables may be recorded from the position of the moveable component of the robotic device. Other variables may also be needed and computed in similar ways.

A material property of the target surface may be determined based on the BRDF image data and by applying at least one pre-trained machine learning model. A material property of the target surface may be, for example, a type of recyclable (e.g. plastic, glass, etc.) or a type of liquid (e.g. water, oil, fruit juice, etc.). The pre-trained machine learning model may be, for example, a neural network, support vector machine (SVM), random forest, or other supervised machine learning algorithm. In examples where the machine learning model is a neural network, the specific neural network may have various architectures dependent on the input dataset and on the complexity of the problem. For example, a neural network applied to BRDF image data without being transformed to a polynomial representation may have a different architecture than a neural network applied to BRDF image data transformed into a polynomial representation (e.g. through optimizing the BRDF image data to fit a model representative of an estimation of the BRDF, such as one of the following: the Torrance-Sparrow model, the Maxwell-Beard model, the Cook Torrance mode, or the He model). Other machine learning models may also be applied, the selection of which may be likewise dependent upon the input data. The output of the machine learning model may be a classification of the material representative of a material property.

Inputs similar to the dataset on which the pre-trained machine learning model was trained may be used to determine the material property. In one instance, the model may be trained on BRDF image data from images converted to angular space. This pre-trained machine learning model may then have BRDF image data from the plurality of images converted to angular space as an input. In another instance, the pre-trained machine learning model may be trained on BRIX image data representative of an estimation of the BRDF. This pre-trained machine learning model may then have BRDF image data representative of an estimation of the BRDF as an input.

Similarly, the dataset used to train the machine learning model may have similar properties to the input images. For instance, during training, the machine learning model may take an input of an array of RGB images taken at different positions of different objects relating to a similar class of objects. During testing, the input to the machine learning model may contain an array of images of one or more objects taken by a similar robotic device taking images following a similar path in similar positions and under similar illumination conditions as the BRDF image data in the dataset. The one or more objects during testing may be associated with a similar class of objects as the class of objects on which the pre-trained machine learning model was trained.

In some examples, the robotic device may be used to distinguish different types of plastics to identify recyclables. A robotic device in this case may be controlled to gather information about an object such as a plastic container. A target surface of the plastic container may be identified and a moveable component of the robotic device may move along a motion path relative to the target surface. A plurality of images from the camera of the target surface may be obtained when a light source is illuminating the target surface. BRDF image data may be determined by converting the plurality of images to angular space with respect to the target surface. Based on the BRDF image data and by applying at least one pre-trained machine learning model, a material property of the surface may be determined. As mentioned above, polynomial coefficients may be determined based on the BRDF image data. The pre-trained machine learning model may take the polynomial coefficients as an alternative input to determine the material property of the surface. In such examples, the material property of the target surface may be the type of plastic. Alternatively, the material property of the target surface may be whether the plastic material is a recyclable type of plastic.

In other examples, the robotic device may be used to determine a type of liquid on a surface, for instance the type of liquid spilled on a surface. The target surface may thus be identified as the liquid resting on a different surface. A method of controlling a robotic device similarly as previously described may be applied to obtain additional information about the liquid. In this case, the motion path may differ from a motion path used to identify a material property of the surface of a plastic container. Likewise, motion paths may differ based on the size of the liquid on the surface and/or based on o in the surroundings. As mentioned above, BRDF image data may be determined based on transforming the image data to angular space and optionally by converting the transformed image data to polynomial coefficients representative of an estimation of a BRIDE In some examples, upon identifying a material property of the target surface, the robotic device may determine a method to clean the surface. For instance, the target surface may be determined to be water. The robotic device may then wipe the surface. In another case, the liquid may be determined to be an oil. The robotic device may then use a cleaner, such as a surfactant, to remove the liquid and/or the residue.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106 and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
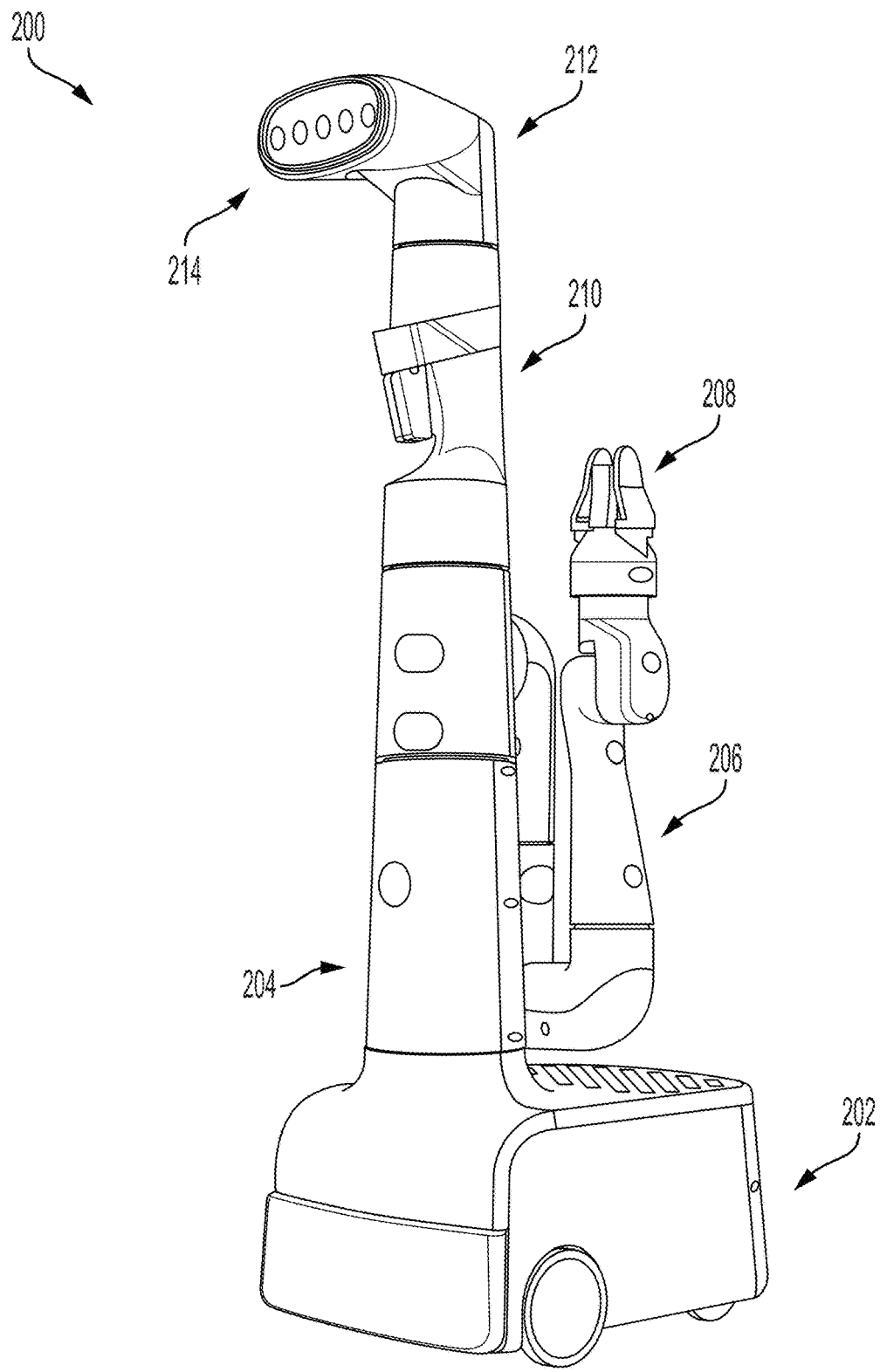
FIG. 2 illustrates a mobile robot, in accordance with example embodiments.
Figure 3:
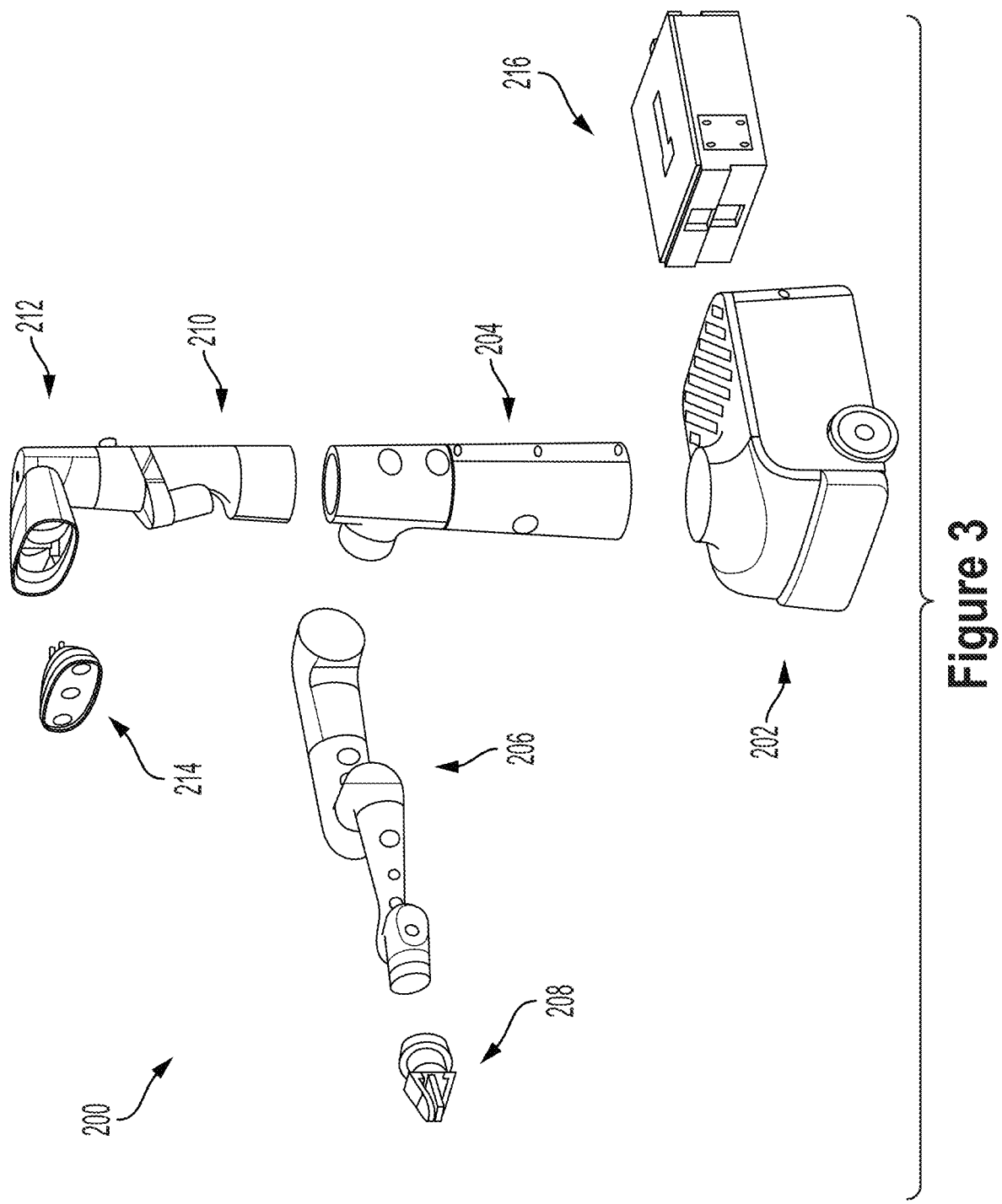
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202 The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOB of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D lidar sensor configured to collect depth information about the environment. The 3D lidar sensor may be coupled to a carved-out portion of the mast 210 and fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared(IR) assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
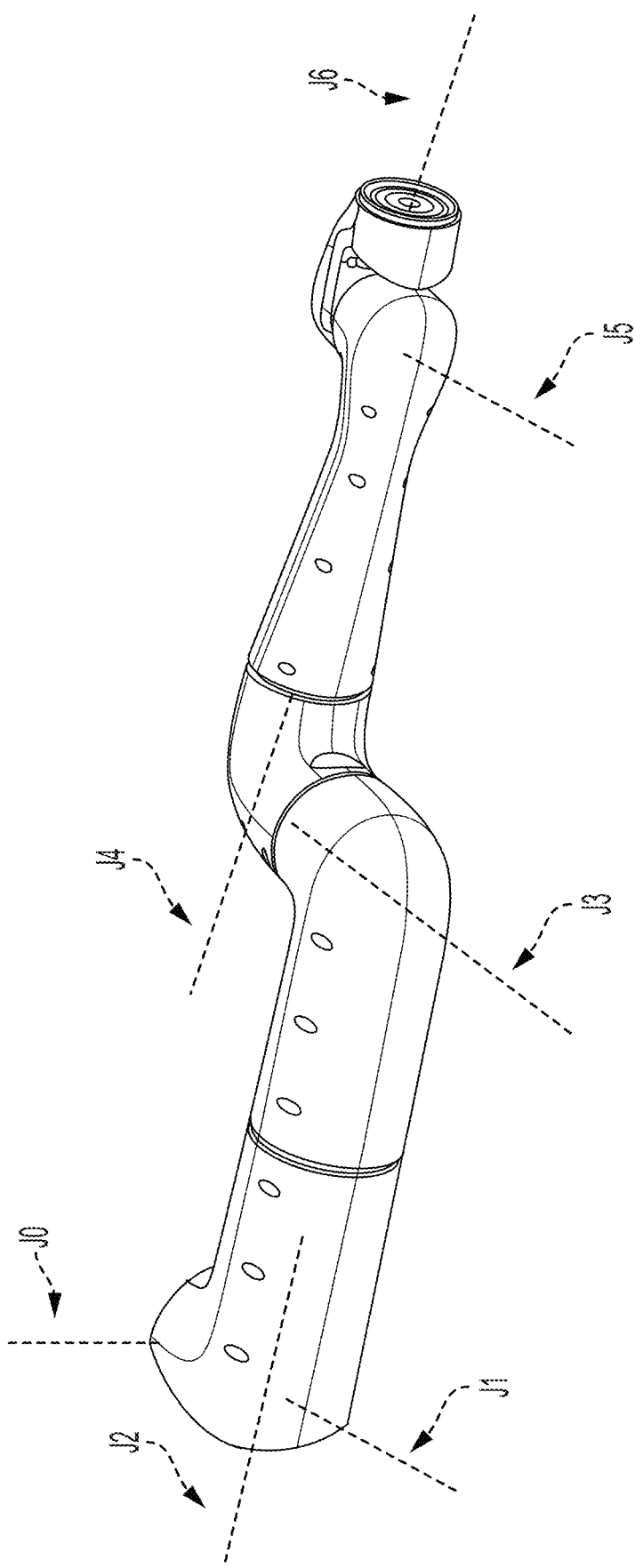
FIG. 4 illustrates a robotic arm, in accordance with example embodiments.

FIG. 4 illustrates a robotic arm, in accordance with example embodiments. The robotic arm includes 7 DOFs a shoulder yaw J0 joint, a shoulder pitch J1 joint, a bicep roll J2 joint, an elbow pitch J3 joint, a forearm roll J4 joint, a wrist pitch J5 joint, and wrist roll J0 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5:
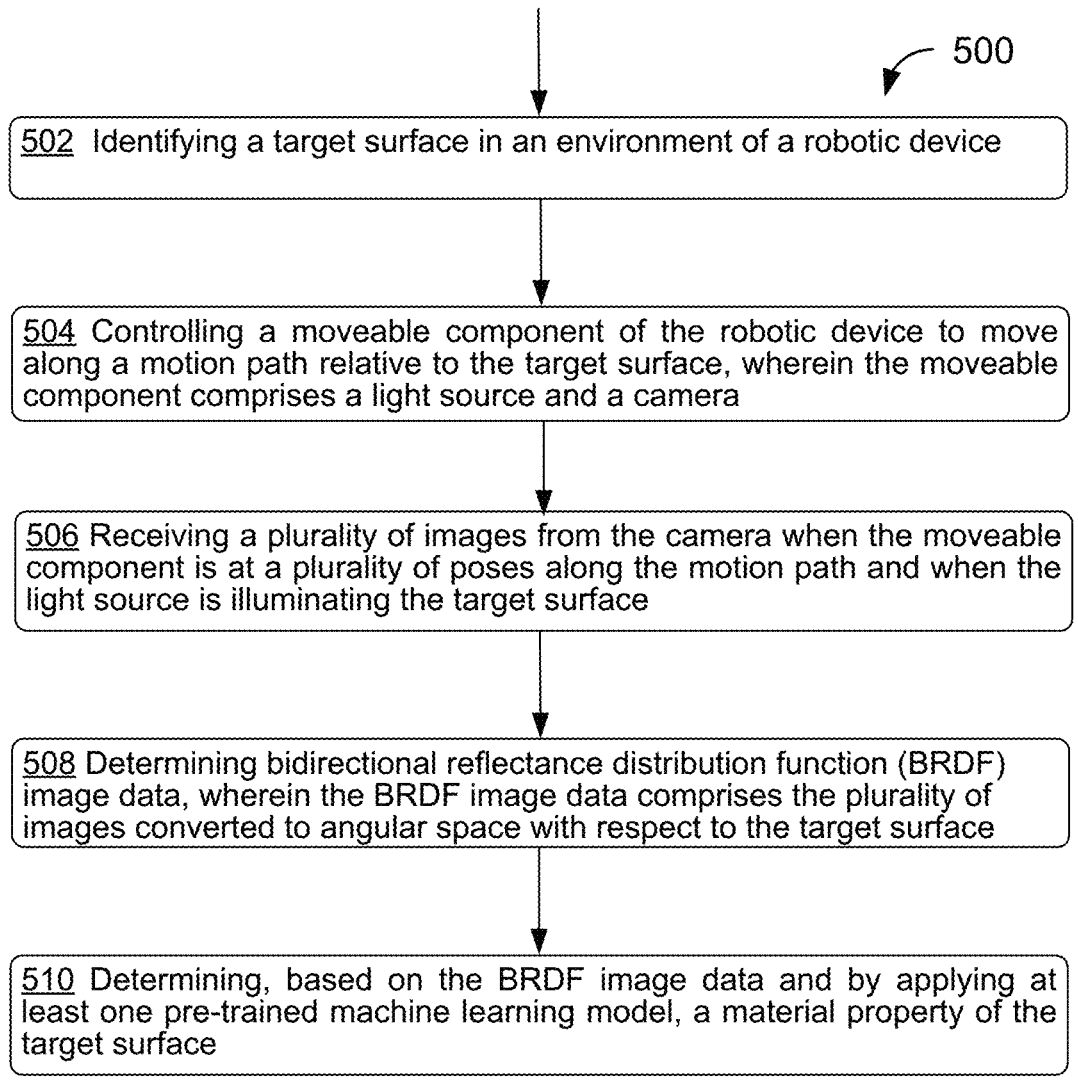
FIG. 5 is a block diagram of a method, in accordance with example embodiments.

FIG. 5 is a block diagram of a method, in accordance with example embodiments. In some examples, method 500 of FIG. 5 may be carried out by a control system, such as control system 118 of robotic system 100. In further examples, method 500 may be carried out by one or more processors, such as processor(s) 102, executing program instructions, such as program instructions 106, stored in a data storage, such as data storage 104. Execution of method 500 may involve a robotic device, such as the robotic device illustrated and described with respect to FIGS. 1-4. Other robotic devices may also be used in the performance of method 500. In further examples, some or all of the blocks of method 500 may be performed by a control system remote from the robotic device. In yet further examples, different blocks of method 500 may be performed by different control systems, located on and/or remote from a robotic device.

At block 502, method 500 includes identifying a target surface in an environment of the robotic device. The robotic device may receive sensor data from sensors on the robotic device (e.g. a camera associated with EOAS 208 or LIDAR associated with perception suite 214) and subsequently, a target surface may be identified by analyzing the sensor data received. The target surface may be the surface of an object present in the environment of the robotic device and may vary in geometry. For example, the robotic device may be tasked with differentiating between different types of recyclables, in which case the target surface may be the plastic, glass, or other material surface of the recyclable. In some applications, the target surface may have similar geometries, e.g. when the robotic device is tasked with sorting bottles, and in other applications, the target surface may have differing geometries, e.g. when the robotic device is tasked with sorting recyclables in general (for example, a piece of paper, a glass jar, etc.).

At block 504, method 500 includes controlling a moveable component of the robotic device to move along a motion path relative to the target surface. The moveable component of the robotic device may include a camera and a light source. For example, the moveable component of the robotic device may be arm 206 as illustrated in FIG. 2 where an end effector, e.g. EOAS 208, includes at least a light source and a camera. In further examples, the moveable component of the robotic device may be EOAS 208 including at least a light source and a camera.

The moveable component of the robotic device may include a camera and a light source in varying arrangements. In some other examples, multiple cameras may be present on the moveable component of the robotic device and may be aligned such that each camera partially shares a common field of view in a stereo pair arrangement. Such an arrangement may be advantageous to increase the field of view and/or increase the accuracy of a depth determination. The moveable component may additionally include multiple cameras and/or multiple light sources, which may be useful in determining BRDF image data, as discussed in later sections.

Many types of cameras and light sources may be attached to the moveable component of the robotic device. Some examples of cameras may include RUB cameras, infrared cameras, cameras able to detect wavelengths in the near infrared spectrum, cameras able to detect wavelengths in the visible spectrum, cameras able to detect wavelengths in the near visible spectrum, and other cameras able to detect other wavelengths of light. In further examples, the camera may be a light-field camera, which may have the ability to measure the direction of incoming light per pixel, thereby facilitating the gathering of more useful information related to the reflected light from the surface. Some examples of light sources may include light emitting diodes, a source configured to output infrared light, or a source configured to output coherent light, among others. Additionally, in some examples for more accurate detection and/or detection of more wavelengths on the electromagnetic spectrum, the light source and camera of the moveable component may form part of a spectrometer, which may measure properties of light (e.g. intensity of light) as a function of the corresponding portion of the electromagnetic spectrum (e.g. as measured by wavelength or frequency). For example, image data obtained from an RGB camera may be transformed to a coarser function of intensity as a function of wavelength. In other examples, the camera may be a specialized detector, such as a charge coupled device, for more accurate detection of intensity and detection of more wavelengths. Other components (e.g. mirrors) may also be incorporated.

In further examples, the light source and the camera may be separated and incorporated into systems on different components of the robotic device. For example, the light source may be a component in a sensor system of a fixed perception system on the robotic device while the camera remains a component in a sensor system of a moveable component of the robotic device. Alternatively, the light source may be a component in a sensor system of a moveable component of the robotic device and the camera may be a component in a sensor system of a fixed perception system on the robotic device.

The moveable component may be controlled to move along a motion path relative to the target surface. In some examples, the motion path may be generally focused around a particular point on the target surface and at each point on the motion path from which an image is taken, the moveable component may be substantially the same distance away from the particular point. For example, in cases where the target surface is a flat piece of paper, the moveable component of the robotic device may be controlled to move around an arc shaped path around a particular point of the piece of paper. Similarly, in cases where the target surface is a curved surface of a pickle jar, the moveable component of the robotic device may be controlled to move around an arc shaped path around a particular point associated with the pickle jar. The curved surface can be approximated to a planar surface at a small area around the point of interest. Motion paths may be at a substantially constant distance from the particular point on the target surface.

At block 506, method 500 includes receiving a plurality of images from the camera when the moveable component is at a plurality of poses along the motion path and when the light source is illuminating the target surface. As the moveable component is being moved. along a motion path, images may be captured by the camera on the moveable component. The images may be of the target surface at various angles. The camera and light source may be aligned to face the same direction (i.e. have parallel normal vectors) or be aligned in different directions, which may affect calculations when determining BRDF image data. As mentioned above, the moveable component may have additional cameras and/or additional light sources. With additional cameras, a robotic device may be able to collect multiple images corresponding to different angles of the target surface at the same time. Additional cameras and/or additional light sources may both contribute to a decreased motion path being necessary for the moveable component of the robotic device and/or to an increased number of images being received by the robotic device.

At block 508, method 500 includes determining bidirectional reflectance distribution function (BRDF) image data. The BRDF image data comprises the plurality of images converted to angular space with respect to the target surface. As mentioned above, BRDF image data may be determined from measuring a subset of the BRDF For example, the BRDF image data may be computed by transforming each of the captured images to angular space with respect to the object surface. In further examples, the BRDF image data may be represented by the coefficients of a multi-dimensional polynomial computed from the transformed images.

At block 510, method 500 includes determining, based on the BRDF image data and by applying at least one pre-trained machine learning model, a material property of the target surface. The pre-trained machine learning model may take BRDF image data and optionally other parameters as an input and output a material property of the target surface. For example, if the target surface is a piece of paper, the pre-trained machine learning model may take, as an input, several transformed images as the BRDF image data and output that the piece of paper is made from paper. Alternatively, the pre-trained machine learning model may output that the material property of the piece of paper is not plastic, glass, etc. The material property of the target surface may be a predefined material (e.g. plastic, glass, paper, etc.), a class of multiple materials (e.g. recyclable, not recyclable, etc.), or a type of liquid (e.g. water, fruit juice, sodas, etc.), among others.

Figure 6:
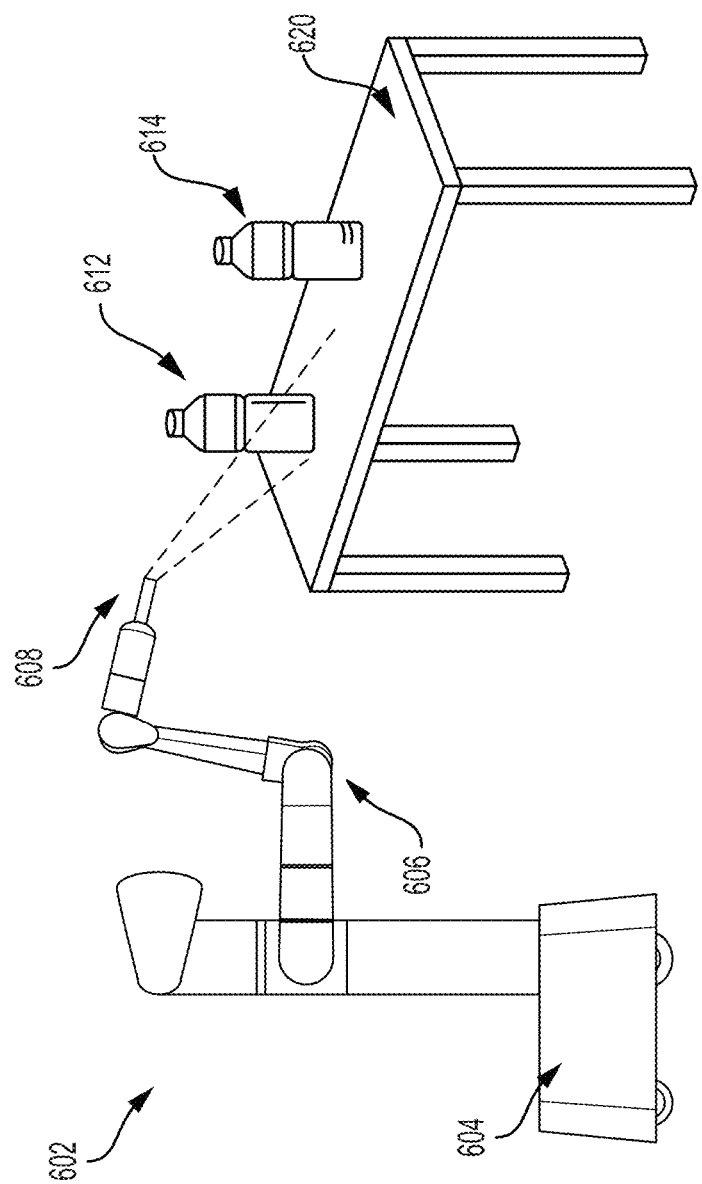
FIG. 6 illustrates a side view of a robotic device sensing an object, in accordance with example embodiments.

FIG. 6 is a side view of a robotic device sensing an object, in accordance with example embodiments. More specifically, robotic device 602 may include base 604 and arm 606. Arm 606 may include end of arm component 608 with a camera or other visual sensor. Arm 606 and end of arm component 608 may both be moveable components of the robotic device. The robotic device 602 may be similar to the robotic device illustrated and described with respect to FIGS. 1-4. In the illustrated example, robotic device 602 is operating in an environment with table 620, on top of which are two bottles, plastic bottle 612 and glass bottle 614. FIG. 6 illustrates one example of an environment of a robotic device and target surfaces being identified. Many other examples are possible.

End of arm component 608 may include a camera or visual sensor and a light source. This camera or another visual sensor on the robotic device 602 may be used by robotic device 602 to determine target objects in the surroundings of robotic device 602 through moving robotic base 604, arm 606, or end of arm component 608. Robotic device 602 may move arm 606 and end of arm component 608 closer to the target object with the target surface. Robotic device 602 may have the ability to perform such a process automatically or with the assistance of a human operator.

In some examples, robotic device 602 may be tasked with sorting recyclables, plastic bottle 612 and glass bottle 614. Robotic device 602 may identify a target surface in the surroundings using the camera on end of arm component 608 and/or using a different visual sensor on robotic device 602. In some examples, the target surface may depend on the task being performed and the material properties that may need to be identified to perform that task.

In some examples, robotic device 602 may be tasked with sorting recyclables. Robotic device 602 may determine that table 620 contains recyclables and determine that the material properties of the recyclables are necessary to determine the type of each of the recyclable. Accordingly, robotic device 602 may identify the target surface as belonging to plastic bottle 612 on top of table 620 and control end of arm component 608 to move through a motion path relative to the identified target surface. Robotic device 602 may take images from various positions along the motion path, determine the BRDF image data from the images, and apply a pre-trained machine learning model to determine a material property of the surface from the determined BRDF image data. Afterwards, robotic device 602 may identify another target surface, e.g. glass bottle 614, control end of arm component 608 to move through a motion path relative to the glass bottle, take images from various positions along the motion path, determine the BRDF image data from the images, and apply the same pre-trained machine learning model to determine a material property of the surface from the determined BRDF image data.

In other examples, robotic device 602 may be tasked with identifying different liquid spills in order to determine the correct type of cleaning substance. Robotic device 602 may determine that a spill is on a surface and that identifying the material property of the spill would aid in determining how to most efficiently clean the surface (e.g. if the spill is water, the robotic device might simply wipe the spill with a towel whereas if the spill is oil based, the robotic device might use a surfactant to break down the oil before wiping the spill). Robotic device 602 may then control end of arm component 608 to move along the motion path, capture images of the surface along different points of the motion path, determine the BRDF image data, and determine the type of spill by applying the BRDF image data as an input to a pre-trained. machine learning model.

Figure 7:
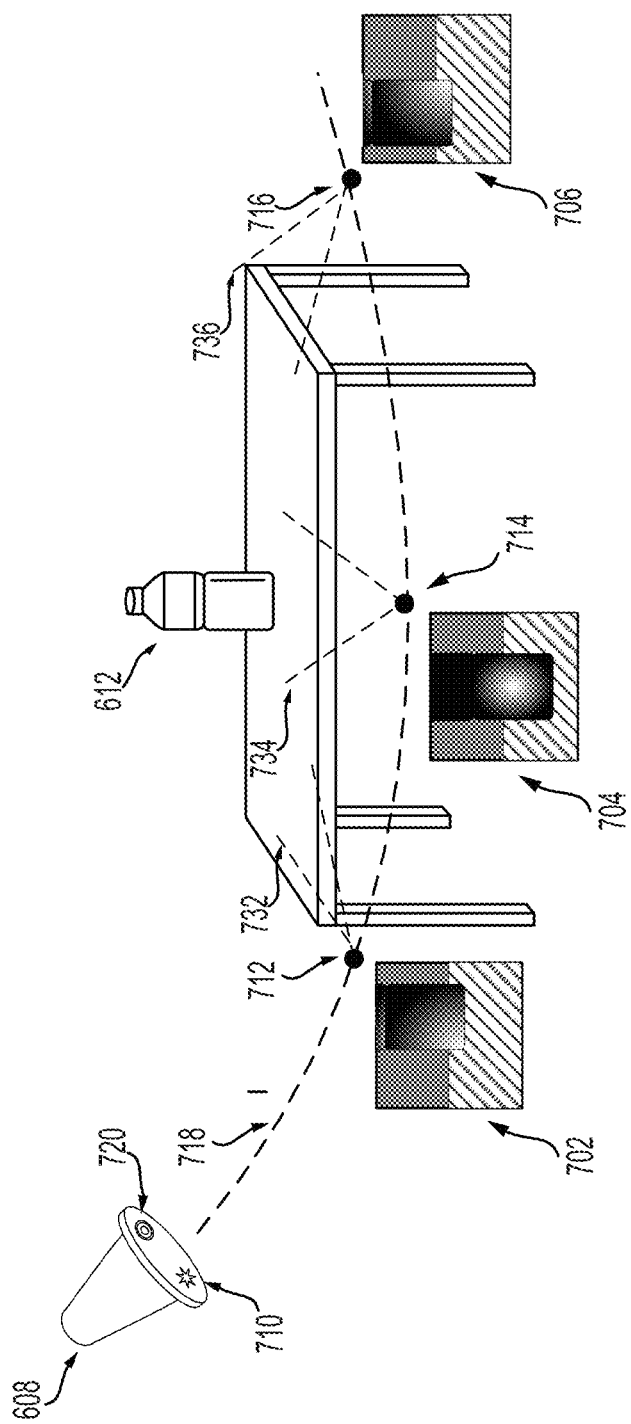
FIG. 7 illustrates a motion path with captured images, in accordance with example embodiments.

FIG. 7 is a motion path with captured images, in accordance with example embodiments. A motion path used by a robotic device to determine one or more material properties may be, for example, motion path 718. A moveable component, e.g. end of arm component 608, may move along motion path 718 to capture images of an object, e.g. plastic bottle 612. End of arm component 608 may have camera 720, or another visual sensor, and light source 710.

Motion path 718 may also differ based on objects in the surroundings as well or instead. For example, the target surface may be next to another object. The robotic device may determine that there is another object next to the target surface and determine motion path 718 to avoid causing end of arm component 608 to collide with the object or to avoid capturing images occluded by the object.

Motion path 718 may also be predefined and used to image many types of objects such that the motion path does not differ based on the situation. in the example above, motion path 718 may be predefined along the path designed for the larger object but despite being predefined, a smaller object, e.g. plastic bottle 612 or glass bottle 614, may nevertheless be imaged effectively.

In other examples, robotic device 602 may store a database of predefined motion paths. Upon determination of a target surface, a certain predefined motion path may be selected based on the size, geometry, or type of target surface. The same or similar predefined motion path may be used for target surfaces associated with a similar size, geometry, or type, e.g. plastic bottle 612 and glass bottle 614, and different motion paths may be used for target surfaces associated with differing size, geometry, or type, e.g. plastic bottle 612 and a piece of paper.

End of arm component 608 may move along motion path 718 to capture images at different angles of an object. For example, end of arm component 608 may pass through point 712 point 714, and point 716 and may use camera 720 to capture images 702, 704, and 706, respectively, of plastic bottle 612. Each image may be at a different angle of the object. For example, image 702 taken at point 712 may have view 732 of a corner of bottle 612. Image 704 may be taken at point 714, at which camera 720 may have view 734 of the middle of bottle 612. Image 706 may be taken at point 716, at which camera 720 may have view 736 of another corner of bottle 612.

Each image 702, 704, and 706 ay be taken with camera 720 on end of arm component 608 while light source 710, also on end of arm component 608, is illuminating the target surface plastic bottle 612). The illumination of the target surface may expose internal and/or external structures of the target surface which may not be displayed or may not be as pronounced under ambient lighting conditions.

Figure 8B:
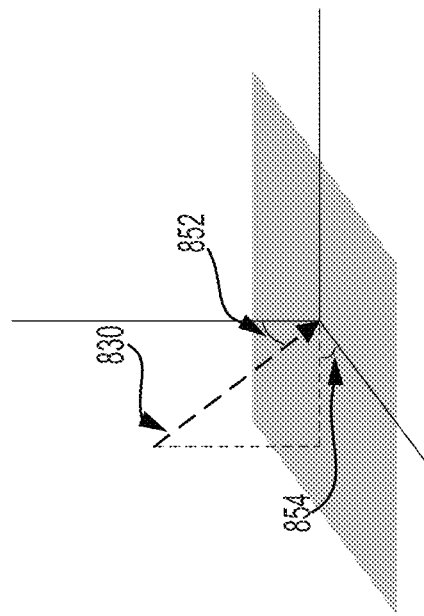
FIG. 8B is an illustration of incoming light, in accordance with example embodiments.
Figure 8C:
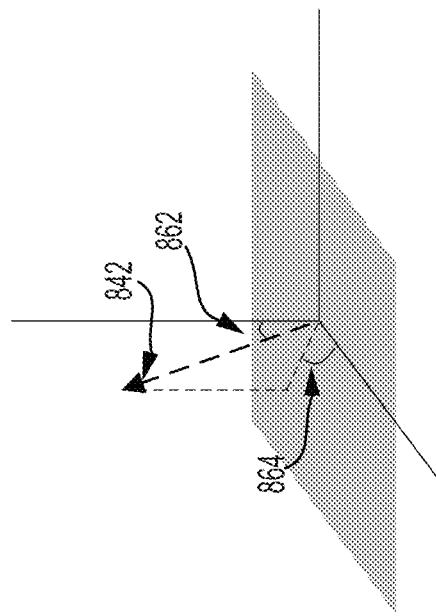
FIG. 8C is an illustration of outgoing light, in accordance with example embodiments.
Figure 8A:
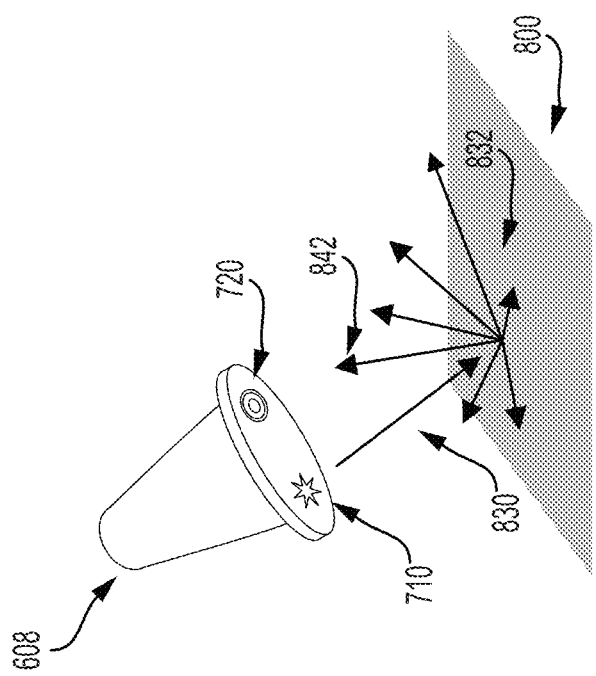
FIG. 8A is an illustration of a surface, in accordance with example embodiments.

FIG. 8A is an illustration of a surface, in accordance with example embodiments. Surface 800 may be a surface of plastic bottle 612. Similar to above examples, end of arm component 608 may have light source 710 and camera 720.

Light source 710 may shine incoming light onto surface 800 and camera 720 may capture outgoing light from surface 800. For example, light source 710 may shine incoming light beam 830 onto surface 800. The internal and/or external structures of surface 800 may cause the light to be reflected in different ways. In the case of incoming light beam 830, light may be scattered in various directions as outgoing light beams 832, illustrating the scattering of light waves on a diffuse surface. Some beams of outgoing light beams 832 may be captured in images by camera 720, such as outgoing light beam 842

The direction of incoming light beam 830 may depend on the angle of light source 710. The direction of outgoing light beams 832 may depend on the angle of incoming light beam 830 and the internal and/or external structure of surface 800. As mentioned above, surfaces, such as surface SOO, may exhibit ideal diffuse reflectances (i.e. a Lambertian surface), perfectly specular reflectances, or a combination of diffuse and specular reflectances. A Lambertian surface may reflect light in various directions equally such that the surface has relatively equal brightness regardless of the observer's observation point. In contrast, a perfectly specular surface, e.g. a mirror, may be smooth and light may be reflected in the opposite direction relative to the surface normal. On a glossy surface exhibiting both diffuse and specular properties, light waves may scatter in similar directions away from the direction of incoming light. Other examples and/or variations of surfaces are also possible. In this example, surface 800 may be a rough surface displaying diffuse and specular properties such that light beams may be reflected in various directions, such as in outgoing light beams 832.

Incoming light beam 830 reflected from surface 800 into outgoing light beams 832 is an example of incoming light and outgoing light for a target surface. In practice, light source 710 may shine many more incoming light beams than shown and surface 800 may reflect many more light beams than shown. Other examples and/or variations are possible.

Light beam 830 and light beams 832 may be used to calculate the BRDF of a target surface. As mentioned above, the BRDF of a target surface may describe surface properties and/or materials of the surface and may be a five-dimensional function representing the reflectance of a surface as a function of incident illumination, measured reflectance, and wavelength. Incident illumination may be incoming light beam 830 and measured reflectance may be one or more of outgoing light beams 832. Both incident illumination and measured reflectance may be measured with respect to the surface normal.

FIG. 8B is an illustration of incoming light, in accordance with example embodiments. Incident illumination may be incoming light beam 830 and may be described by two angles, the azimuth angle and the elevation angle. For example, incoming light may have azimuth angle 854 and elevation angle 852.

FIG. 8C is an illustration of outgoing light, in accordance with example embodiments. Measured reflectance may be outgoing light beam 842. Similar to incident illumination, measured reflectance may be described by two angles, the azimuth angle and the elevation angle. Measured reflectance may have azimuth angle 864 and elevation angle 862.

A complete BRDF may be measured by individually manipulating wavelength and the azimuth angle and elevation angle of each incident illumination and measured reflectance. The azimuth angle and elevation angle of incident illumination may be manipulated by changing the angle at which the light from the light source hits the target surface. Similarly, the azimuth angle and elevation angle of measured reflectance may be influenced by changing the angle at which the camera or sensor measures the scattered light. However, due to the high dimensionality of the BRDF, it may be more feasible to measure a subset of the BRDF. Image data of a subset of the BRDF may be obtained from images taken at various points around the motion path.

These images may subsequently be mapped into angular space to obtain BRDF image data. For example, each pixel of the image may be assigned coordinate values corresponding to their relative placements. The coordinate values may then be translated into angular space (e.g. from rectangular coordinates to spherical coordinates so that the respective placements are represented by angles rather than distance) to obtain BRDF image data. The color of each pixel associated with the images may be taken into account as the measured wavelength.

As mentioned above, the BRDF image data may be then translated into a multi-dimensional polynomial function, the coefficients of which may also be termed BRDF image data. This BRDF image data may be representative of an estimated BRDF and calculated using models developed from the generalization and simplification of the general MTV formula. Some examples of previously developed models representative of an estimation of the BRDF include the Torrance-Sparrow model, the Maxwell-Beard model, the Cook Torrance model, and the He model.

In alternative examples, rather than using BRDF image data, speckle pattern data may be used to determine material types of objects. More specifically, incoming light from light source 710 may output coherent light, e.g. light from a laser. Light waves in coherent light may oscillate at approximately the same frequency and each light wave may be aligned with each other such that the light waves are in phase with one another. The textures on surface 800 may cause the light waves to be scattered in various directions as outgoing light beams 832, where each wave has similar frequencies, but not different phases. Consequently, a speckle pattern depicting the underlying surface roughness is formed, similar to a BRDF. Images of this speckle pattern may be inputted into the pre-trained machine learning model as speckle pattern data, without being transformed into BRDF image data.

Figure 9:
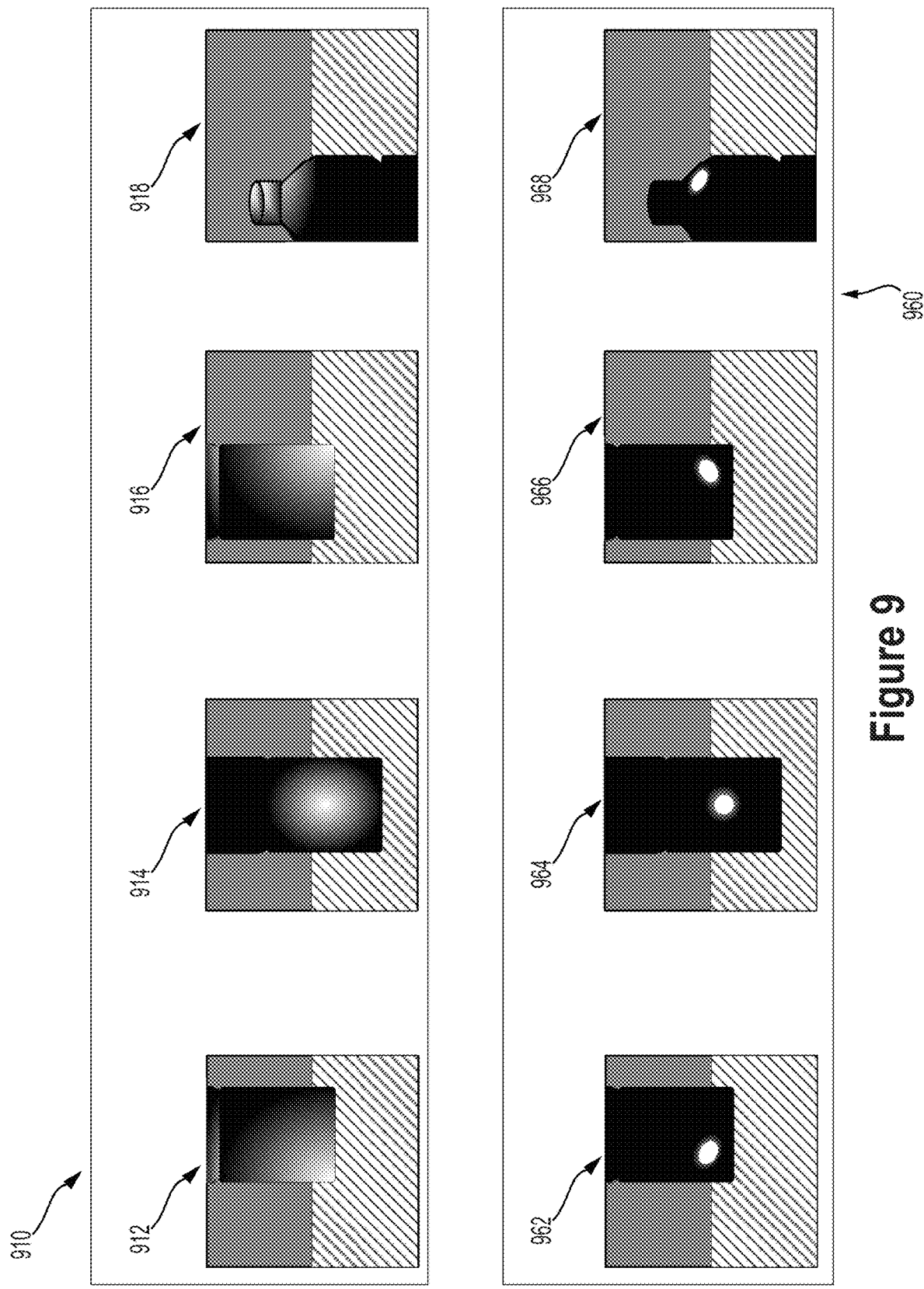
FIG. 9 illustrates captured images of two objects, in accordance with example embodiments.

FIG. 9 is an example of captured images representing two objects, in accordance with example embodiments. Image set 910 includes images 912, 914, 916, and 918 of a plastic bottle taken from poses along a motion path by a camera on a moveable component of the robot. Similarly, image set 960 includes images 962, 964, 966, and 968 of a glass bottle taken from poses along a motion path by a camera on a moveable component of the robot.

Although the plastic bottle and the glass bottle may be difficult to differentiate under ambient lighting, it may be observed that the plastic bottle and the glass bottle have different material properties when taken with illumination and at different angles. For example, images in set 910 display more diffuse properties as the object in the images appears more flat. In contrast, images in set 960 display more specular reflectances as the object in the images appears more glossy.

Images in set 910 and set 960 may be translated into angular space to form BRDF image data. Additionally, the images converted into angular space may be used to calculate an estimation of the BRDF as a polynomial function. In some examples, the translated images and perhaps other data (e.g. angle of end of arm component with respect to the surface) may serve as inputs to a pre-trained machine learning model. In other examples, the coefficients of the polynomial function representative of an estimation of the BRDF may serve as inputs to the pre-trained machine learning model along with perhaps other data.

The pre-trained machine learning model may be a machine learning model involving either supervised or unsupervised learning. Regardless, the initial untrained machine learning model may be trained on similar data as the intended input (and perhaps output) to obtain a pre-trained machine learning model. In the case of supervised learning, the machine learning model may involve a neural network, support vector machines, random forest, among other models.

For example, a neural network may be used as the machine learning model and take as an input a multi-dimensional matrix. In some examples, images of various objects may be taken using a fixed motion path, e.g. as in set 910 and set 960. Images in set 910 may be stacked in the order of images 912, 914, 916, and 918 and images in set 960 may similarly be stacked in the order of images 962, 964, 966, and 968, such that images 912 and 962 are taken from the same position, images 914 and 964 are taken from the same position, and so on. To identify a material property of each set of images, the sets of images (e.g. 910 and 960) may then be individually inputted or stacked together into a neural network.

In other examples, images of various objects may be taken using varying motion paths. Such images may be stacked in a similar manner. For example, images may be organized with respect to a perpendicular vector from the surface of the object. Other alternatives of input geometries (e.g. concatenating each input picture, etc.) are also possible. Other information (e.g. angle of end of arm component with respect to the surface) may be added as an input as an additional "image" in the stack, as an additional dimension, etc.

Each set may be labeled with a material property or a representation of the material property. For example, set 960 may be labeled as plastic and set 920 may be labeled as glass. Plastic may correspond to a first category and glass may correspond to a second category. The output of the machine learning model may thus be an integer 1 or 2, corresponding to plastic or glass, respectively. Other alternatives of input geometries and outputs are also possible.

The neural network may use these labeled sets of inputs and outputs as training data for a pre-trained machine learning model. Similar inputs, except without labels, may be used as inputs to the pre-trained machine learning model. Subsequently, the pre-trained machine learning model may output labels, or material property classifications, for each respective input target surface.

If the input to the machine learning model are coefficients from polynomials representing an estimate of the BRDF, a simpler algorithm such as support vector machines and random forest models may be used to identify material properties. In this case, coefficients may be labeled with the material property (in a similar manner as above) and may serve as training data for the machine learning model. Coefficients without labels may be used as inputs to the pre-trained machine learning model and subsequently, the pre-trained machine learning model may output material property classifications for each respective input target surface, A pre-trained machine learning model may be specific to the application. In some examples, a robotic device may specialize in sorting recyclables. The pre-trained machine learning model in this case may be trained on data representative of the internal and/or external structures of recyclables and specific plastics. In other examples, a robotic device may specialize in identifying a type of liquid spilled. The pre-trained machine learning model in this case may be trained on data representative of the surface texture of different liquids and different spills. Accordingly, the outputs may be specific to the type of plastic or type of spill. The pre-trained machine learning model may also be further trained on a set of past images collected from the robotic device in past applications perhaps with the original training set to achieve better accuracy and/or fine tune the initial pre-trained machine learning model to the applications at hand.

In some examples, the pre-trained machine learning model may output probabilities or confidence intervals for each classification category. The robotic device may determine if the probability or confidence interval meets a threshold. If not, the robotic device may determine that more images are needed to identify the material property of the target surface. Accordingly, the robotic device may determine another motion path and may gather additional images at varying angles of the target surface. These images, perhaps along with the previous images may then be used to determine a material property of the target surface.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   identifying a target surface in an environment of a robotic device;
   controlling a moveable component of the robotic device to move along a motion path relative to the target surface, wherein the moveable component comprises a light source and a. camera;
   receiving a plurality of images from the camera when the moveable component is at a plurality of poses along the motion path and when the light source is illuminating the target surface;
   determining bidirectional reflectance distribution function (BRDF) image data, wherein the BRDF image data comprises the plurality of images converted to angular space with respect to the target surface; and
   determining, based on the BRDF image data and by applying at least one pre-trained machine learning model, a material property of the target surface.

2. The method of claim 1, wherein the at least one pre-trained machine learning model comprises a neural network.

3. The method of claim 1, wherein the method further comprises determining, based on the material property the target surface, that the target surface is part of an object of one of a plurality of types of recyclable objects.

4. The method of claim 1, wherein the method further comprises determining, based on the material property of the target surface, that the target surface is a liquid.

5. The method of claim 1, wherein the camera and the light source form a part of a spectrometer.

6. The method of claim 1, wherein the camera is configured to sense wavelengths of light in at least near infrared and visible regions of an electromagnetic spectrum and wherein the light source is configured to output wavelengths of light in the at least near infrared and visible regions of an electromagnetic spectrum.

7. The method of claim 1, wherein the camera is a red green blue (RGB) camera.

8. The method of claim 1, wherein the camera is a light-field camera.

9. The method of claim 1, further comprising determining the motion path based on a geometry of the target surface.

10. The method of claim 1, further comprising determining the motion path based on at least one object not associated with the target surface in the environment of the robotic device.

11. The method of claim 1, wherein the camera of the moveable component is positioned at substantially a same distance from the target surface at each of the plurality of poses along the motion path.

12. The method of claim 1, wherein a geometry of the motion path is predefined to be an arc relative to a particular point on the target surface.

13. The method of claim 1, further comprising:
determining a probability corresponding to the material property; and.
based on the probability, determining whether to control the moveable component of the robotic device to move along a different motion path to collect additional images of the target surface.

14. The method of claim 1, further comprising estimating, based on the BRDF image data, a plurality of polynomial coefficients representative of a BRDF, wherein the plurality of polynomial coefficients are inputs to the at least one pre-trained machine learning model.

15. The method of claim 14, wherein the at least one pre-trained machine learning model is a neural network, a support vector machine, or a random forest.

16. The method of claim 1, wherein the moveable component further comprises one or more additional cameras.

17. The method of claim 16, wherein the camera and an additional camera of the one or more additional cameras are arranged to be aligned with partially overlapping fields of view.

18. The method of claim 16, wherein the moveable component further comprises one or more additional illumination sources.

19. A robotic device, comprising:
a moveable component on the robotic device, wherein the moveable component comprises a light source and a camera; and
a control system configured to:
identify a target surface in an environment of the robotic device;
control the moveable component of the robotic device to move along a motion path relative to the target surface;
receive a plurality of images from the camera when the moveable component is at a plurality of poses along the motion path and when the light source is illuminating the target surface;
determine bidirectional reflectance distribution function (BRDF) image data, wherein the BRDF image data comprises the plurality of images converted to angular space with respect to the target surface; and
determine, based on the BRDF image data and by applying at least one pre-trained machine learning model, a material property of the target surface.

20. A non-transitory computer readable medium comprising program instructions executable by at least one processor to cause the at least processor to perform functions comprising:
identifying a target surface in an environment of a robotic device;
controlling a moveable component of the robotic device to move along a motion path relative to the target surface, wherein the moveable component comprises a light source and a camera;
receiving a plurality of images from the camera when the moveable component is at a plurality of poses along the motion path and when the light source is illuminating the target surface;
determining bidirectional reflectance distribution function (BRDF) image data, wherein the BRDF image data comprises the plurality of images converted to angular space with respect to the target surface; and
determining, based on the BRDF image data and by applying at least one pre-trained machine learning model, a material property of the target surface.

* * * * *